(12) United States Patent
Levy et al.

(10) Patent No.: US 11,211,071 B2
(45) Date of Patent: Dec. 28, 2021

(54) SYSTEM, METHOD, AND COMPUTER PROGRAM PRODUCT FOR HOME APPLIANCE CARE

(71) Applicant: American International Group, Inc., New York, NY (US)

(72) Inventors: Fernando Levy, New York, NY (US); Cynthia Brosnan, New York, NY (US); Kevin Callahan, Louisville, KY (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 197 days.

(21) Appl. No.: 16/715,864

(22) Filed: Dec. 16, 2019

(65) Prior Publication Data

US 2020/0193993 A1 Jun. 18, 2020

Related U.S. Application Data

(60) Provisional application No. 62/779,848, filed on Dec. 14, 2018.

(51) Int. Cl.
*G10L 15/22* (2006.01)
*G10L 15/30* (2013.01)
*G10L 15/18* (2013.01)

(52) U.S. Cl.
CPC .......... *G10L 15/22* (2013.01); *G10L 15/1815* (2013.01); *G10L 15/30* (2013.01); *G10L 2015/223* (2013.01)

(58) Field of Classification Search
USPC ..................................................... 704/1–504
See application file for complete search history.

(56) References Cited

U.S. PATENT DOCUMENTS

| 8,522,283 | B2* | 8/2013 | Laligand | H04N 21/4828 |
| | | | | 725/53 |
| 8,938,388 | B2* | 1/2015 | Jia | G10L 15/06 |
| | | | | 704/231 |
| 9,443,527 | B1* | 9/2016 | Watanabe | G10L 15/26 |
| 10,026,401 | B1* | 7/2018 | Mutagi | G06F 3/167 |
| 10,185,544 | B1* | 1/2019 | Mutagi | G06F 3/167 |
| 10,657,953 | B2* | 5/2020 | Park | G10L 15/30 |
| 10,692,499 | B2* | 6/2020 | Lim | G10L 15/22 |
| 10,755,706 | B2* | 8/2020 | Huang | G06F 3/167 |
| 10,825,454 | B1* | 11/2020 | Mutagi | G10L 15/22 |

(Continued)

*Primary Examiner* — Marcus T Riley
(74) *Attorney, Agent, or Firm* — Snell & Wilmer L.L.P.; Lisa M. Knight

(57) ABSTRACT

Systems and methods for generating a request to an appliance service provider include the use of a processor in operable arrangement with a microphone to receive an audio signal therefrom and a computer-readable medium to execute an appliance service program contained therein. The appliance service program includes a speech recognition module, a command intent discernment module configured to determine whether speech data from the speech recognition module includes command data and appliance data, a fetch module to send appliance data from the audio signal to a content server in response to the command intent discernment module determining the speech data includes a service connect command and to receive the appliance service data from the content server, and an interface module configured to transmit the appliance service data to a user interface.

25 Claims, 7 Drawing Sheets

(56) References Cited

U.S. PATENT DOCUMENTS

| | | | | |
|---|---|---|---|---|
| 10,878,826 B2* | 12/2020 | Li | ............................ | G10L 17/22 |
| 11,017,217 B2* | 5/2021 | Jazaery | .................... | G06F 3/017 |
| 2011/0313775 A1* | 12/2011 | Laligand | ............ | H04N 21/4355 |
| | | | | 704/275 |
| 2013/0030802 A1* | 1/2013 | Jia | ............................ | G10L 15/06 |
| | | | | 704/231 |
| 2015/0068069 A1* | 3/2015 | Tran | ..................... | A43B 13/183 |
| | | | | 36/136 |
| 2018/0308470 A1* | 10/2018 | Park | ....................... | G10L 15/063 |
| 2018/0308482 A1* | 10/2018 | Ro | ........................... | G06F 3/167 |
| 2018/0308483 A1* | 10/2018 | Myoung | ................. | G10L 15/22 |
| 2018/0308490 A1* | 10/2018 | Lim | ........................ | G10L 15/26 |
| 2019/0206411 A1* | 7/2019 | Li | ............................ | G06F 3/167 |
| 2019/0281878 A1* | 9/2019 | Tang | ..................... | A61B 5/4866 |
| 2019/0295542 A1* | 9/2019 | Huang | .................... | G10L 15/30 |
| 2019/0348044 A1* | 11/2019 | Chun | ..................... | G06N 3/004 |
| 2020/0082827 A1* | 3/2020 | Lee | ......................... | G10L 15/22 |
| 2020/0110928 A1* | 4/2020 | Jazaery | .............. | G06K 9/00335 |

* cited by examiner

SYSTEM, METHOD, AND COMPUTER PROGRAM PRODUCT FOR HOME APPLIANCE CARE

CROSS-REFERENCE TO RELATED APPLICATION

This patent application claims the benefit of priority to U.S. Provisional Patent Application No. 62/779,848, filed Dec. 14, 2018, and entitled, "System, Method, and Computer Program Product for Home Appliance Care," which is incorporated in its entirety herein by this reference.

TECHNICAL FIELD

This patent disclosure relates, generally, to systems, methods, and computer program products for facilitating the repair and maintenance of a home appliance and, more particularly, to systems, methods, and computer program products for helping an appliance owner find appliance service providers located within a predetermined area of the location of the appliance.

BACKGROUND

When a residential appliance (such as, e.g., a refrigerator, stove, microwave, dishwasher, washing machine, dryer, etc.) malfunctions or otherwise requires maintenance, such repairs and upkeep are beyond the skill and experience of a typical owner. In such a situation, owners of these appliances often have difficulty in finding a service provider capable of servicing the appliance in question.

As an initial matter, the servicing of a particular appliance is not frequently required, and it may be quite some time between appliance service occurrences for a given owner. The owner will have to find service provider contact information, and this might involve multiple steps.

When interacting with the service provider, the service provider may ask questions about the appliance, such as, e.g., make and model and serial number information, etc. The owner typically also is asked whether the appliance is under warranty. The amount of information that the owner may need is numerous and can become cumbersome.

There is a continued need in the art for solutions that will help an appliance owner repair and maintain the appliance. For example, there is a need for systems and techniques for helping an appliance owner alleviate some of the burden in finding a service provider that meets predetermined criteria relating to the repair/maintenance of a given appliance.

It will be appreciated that this background description has been created by the inventors to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY

This disclosure is directed to embodiments of systems, methods, and computer program products for home appliance care. Embodiments of systems and methods for servicing an appliance are described herein. Embodiments of a non-transitory, computer-readable storage medium bearing computer executable instructions for servicing a home appliance are also described herein.

In one embodiment, a system for servicing an appliance includes a microphone, a non-transitory computer-readable medium, a processor, and a network interface. The microphone is configured to generate an audio signal based upon sound input received by the microphone. The non-transitory computer-readable medium includes an appliance service program. The processor is in operable arrangement with the microphone and the computer-readable medium. The processor is arranged with the microphone to receive the audio signal therefrom and is configured to execute the appliance service program. The network interface is configured to receive appliance service data from a content server located remotely from the processor. The network interface is in communicative relationship with the processor and the content server to exchange data therebetween.

The appliance service program includes a speech recognition module, a command intent discernment module, a fetch module, and an interface module. The speech recognition module is configured to identify speech data from the audio signal representing utterances by a user. The command intent discernment module is configured to determine whether the speech data includes command data and appliance data. The command data corresponds to a service connect command. The appliance data includes information about the appliance. The fetch module is configured to communicate with the content server via the network interface, to send the appliance data to the content server in response to the command intent discernment module determining the speech data includes the service connect command, and to receive the appliance service data from the content server. The appliance service data is based upon the appliance data. The interface module is configured to transmit the appliance service data to a user interface.

In another aspect, an embodiment of a method for servicing an appliance includes transmitting, by a microphone, an audio signal to a processor. The audio signal is based upon sound input received by the microphone. The processor is employed to execute computer executable instructions stored on a non-transitory, computer-readable medium to perform steps. Speech data is identified from the audio signal representing utterances by a user. Whether the speech data includes a service connect command data and appliance data including information about the appliance is determined. In response to determining the speech data includes the service connect command, a network interface is used to send the appliance data to a content server and to receive appliance service data from the content server. The appliance service data is based upon the appliance data. The appliance service data is transmitted to a user interface.

In still another aspect, an embodiment of a non-transitory, computer-readable storage medium bears computer executable instructions for servicing a home appliance. The instructions, when executing on one or more computing devices, perform steps.

Speech data from an audio signal from a microphone is identified. The speech data represents utterances by a user. It is determined whether the speech data includes a service connect command and appliance data including information about the appliance. In response to determining the speech data includes the service connect command, a network interface is used to send the appliance data to a content server and to receive appliance service data from the content server. The appliance service data is based upon the appliance data. The appliance service data is transmitted to a user interface.

As will be appreciated, the principles relating to appliance care and servicing disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

DETAILED DESCRIPTION

Figure 1:
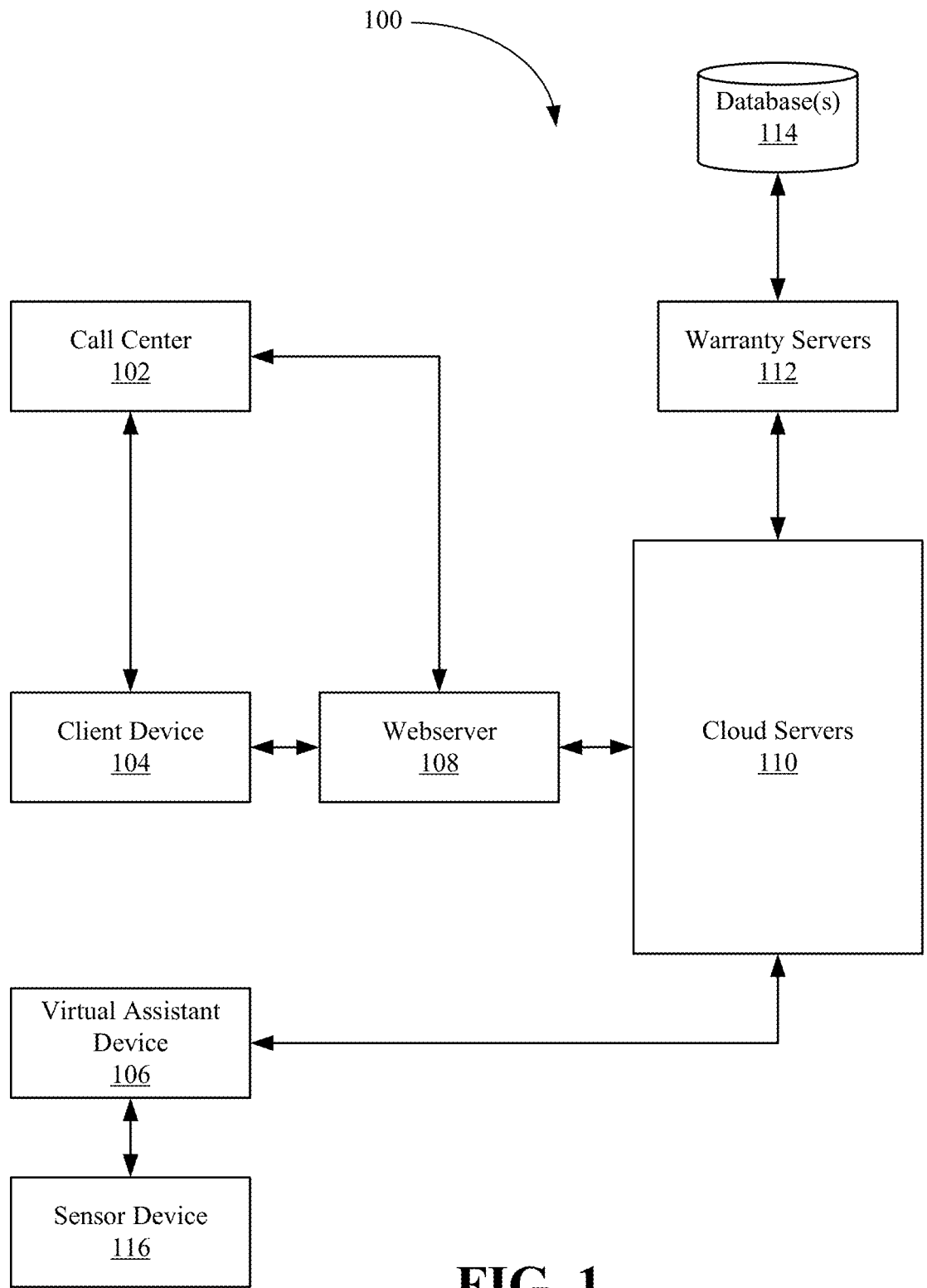
FIG. 1 is a system for generating a request to a service provider using a conversational device according to an embodiment of the present disclosure.

Embodiments of systems and methods for generating a request to a service provider using a conversational device are described herein. Further and alternative aspects and features of the disclosed principles will be appreciated from the following detailed description and the accompanying drawings. As will be appreciated, the principles relating to generating the request to the service provider for repairing or performing maintenance disclosed herein are capable of being carried out in other and different embodiments, and capable of being modified in various respects. Accordingly, it is to be understood that the following detailed description is exemplary and explanatory only.

A service plan owner may have multiple appliances on her property. Appliances include refrigerators, ice makers, dishwashers, dryers, washers, stoves, microwaves, ovens, cooktops, ceiling fans, garage door openers, air conditioners, furnaces, pool heaters, irrigations systems, security systems, and so on. These appliances may be under warranty with different guarantors. Furthermore, some of these appliances may be insured as part of a home insurance policy. When a service plan owner's appliances break, the service owner must contact a service provider in order to have his appliance repaired. The process of contacting a service provider has multiple steps and requires the owner to contact multiple independent sources for information and assistance, which often results in a negative user experience.

Embodiments of the disclosure provide systems and methods for improving user experience by combining the multiple steps involved in contacting a service provider. The service plan owner (or the user) connects with a conversational artificial intelligence (AI) through either a voice interface or chatbot. Utilizing the conversational AI, embodiments of the disclosure guide the user to the result they require. The embodiments integrate internal databases with the conversational AI, allowing for a user-friendly and helpful experience.

Embodiments of the disclosure provide systems and methods for a "service genie" for determining warranty. The service genie is an on-demand home product support system, leveraging conversational AI. The service genie system can improve customer experience by providing servicer details and manufacturer contact information and also by scheduling repairs. The service genie system can connect to a live agent. The service genie system can allow warranty customers to get service provider contact details, extended warranty information, maintenance tips for their appliance and service plan awareness.

Embodiments of the disclosure provide systems and methods for a "service genie" using Amazon Web Services (AWS) for determining warranty information. The service genie leverages AWS services—such as Lambda (Conversational AI), S3 (Content Management), SNS (Simple Notification Service), and Lex—and integrates them with pre-existing Warranty databases to deliver content to customers. Lex is a NLU (Natural Language Understanding) engine that can recognize the intent of a statement, allowing developers to build life-like conversational interactions. These services provide a scalable environment that can be integrated easily with Amazon Alexa as well as with Facebook Messenger, Google Home, and so on.

The network for receiving warranty information (network servers) may be older and may not meet performance requirements, i.e., might be a legacy network. The network might utilize non-pertinent data to organize information in databases. For example, a user's phone number or zip code may be a necessary query to access data in the legacy database. Embodiments of the disclosure utilize conversational AIs to fish for and receive the non-pertinent data to unlock the key for the legacy database.

The service genie uses AWS Lex for building conversational interfaces. Amazon SNS service is leveraged for delivery of messages, predominantly to mobile users. Amazon S3 is leveraged for storing content such as video, audio and images. RESTful API is used to read and update data from warranty database(s) and related external services. AWS Lambda is used to build server-less application to host and run Node.js 6.10 based application code within the standard runtime environment. The events AWS Lambda is used and triggered by two applications:

a. Alexa Skill Kit (ASK) Alexa Echo/Echo Show applications are built using ASK—which acts as a trigger for API Gateway, which will then trigger Lambda.

b. AWS Lambda Interacts with the warranty database using a RESTful web service, exposed to internet. Information is stored in DynamoDB to improve service performance.

AWS Lambda has functional access to resources, e.g., Amazon Cloud Watch Logs used for real time logging of events for debugging and monitoring.

Embodiments of the disclosure provide a system and method for providing connected protection for consumers, allowing them access to the following functionalities:

a. Servicing: (1) active service contract owners can schedule repair appointments; and/or (2) out of contract customers have access to a trusted service network.

b. Troubleshooting: (1) 24/7 troubleshooting for common problems; (2) on the spot claim entitlement for user who progress through troubleshooting.

c. Routine Maintenance: (1) set routine maintenance reminders for all products; (2) automatically receive reminders from connected products.

d. Connected Appliance Notifications: automatically alerts about potential problems from connected products.

e. Service Contract & Home Warranty Sales Channel: (1) provide opportunities for customers to purchase or extend Service contracts or warranties; (2) provide opportunities to sell Home Warranty.

f. Omni-Channel Solution: access points ranging from voice interface to chatbot, phone application, and web application.

Embodiments of the disclosure provide a system and method that integrates conversational AI with warranty infrastructure for minimizing latency.

The Figures show a number of different embodiments of a system for implementing a service genie constructed according to principles of the present disclosure.

FIG. 1 is a system 100 for generating a request to a service provider using a conversational device according to an embodiment of the present disclosure. The system 100 includes a call center 102, one or more client devices 104, a virtual assistant device 106, a webserver 108, cloud servers 110, warranty servers 112, one or more databases 114, and one or more sensor devices 116 in communication with each other via a network interface.

Client device 104 and virtual assistant device 106 are conversational devices that enable a user, a service plan owner, or a customer to generate the request to the service provider. Each of the client device 104 and the virtual assistant device include a microphone configured to generate an audio signal based upon sound input received by the microphone. Client device 104 includes a smart phone, a laptop computer, a desktop computer, and so on. Virtual assistant device 106 is a smart device that allows the user to use voice commands for generating the request to the service provider. Virtual assistant devices 106 include, e.g., smart speakers like Amazon Echo, Amazon Echo Show, Google Home, Harman Kardon Invoke, and so on. Virtual assistant devices 106 are powered with software agents known as intelligent personal assistants. Examples of intelligent personal assistants include Amazon Alexa, Google Assistant, Cortana, Siri, and so on.

Each of the client device 104 and the virtual assistant device 106 include a processor in operable arrangement with the microphone and a computer-readable medium that bears an appliance service program. The processor is arranged with the microphone to receive the audio signal therefrom and is configured to execute the appliance service program. The network interface is configured to receive appliance service data from a content server, such as the cloud servers 110 and the warranty servers 112, located remotely from the processor.

Call center 102 include devices such as smartphones, computers, and so on for interacting with the client device 104. A live agent at the call center 102 interacts with a customer using the client device 104 to determine parameters to use in generating the request to a service provider.

The conversational devices, client device 104 and/or virtual assistant device 106, or the call center 102 request information from warranty servers 112 via cloud servers 110. The client device 104 can use a chatbot via a website hosted on the webserver 108 to interact with the warranty servers. The virtual assistant device 106 can directly send requests to the cloud servers 110 for interacting with the warranty servers 112.

The cloud servers 110 host applications stored on a non-transitory computer-readable medium that allow requesting and obtaining information. The cloud servers 110 provide information technology (IT) as a service over the internet so that applications providing additional functionality to the virtual assistant device 106 can be deployed on the cloud servers 110 to facilitate generating the request to the service provider according embodiments of the disclosure. Examples of cloud servers 110 include Amazon Web Services (AWS), Google Cloud Platform, Microsoft Azure, Oracle Cloud, and so on.

The warranty servers 112 include information on warranties for service plan owners. The warranty servers 112 can use one or more databases 114 to facilitate in determining warranty information and determining service providers qualified for specific warranties held by a service plan owner.

Figure 2:
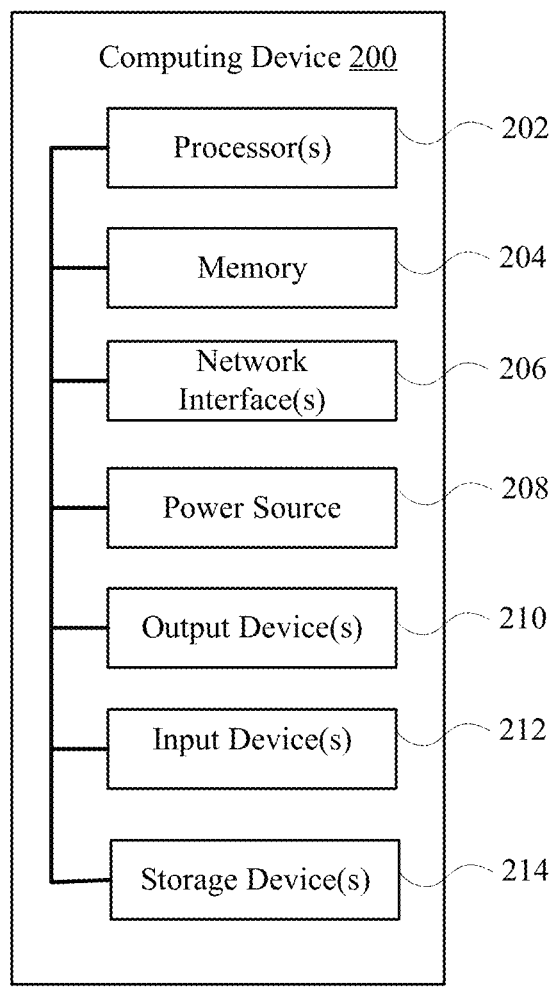
FIG. 2 is a block diagram illustrating basic hardware components of a computing device according to an embodiment of the present disclosure.

Sensor devices 116 are embedded in one or more appliances for providing working information on the appliance. For example, the sensor devices 116 can be temperature sensors of a refrigerator, fuse state detectors for appliances, microprocessors that provide error codes when an appliance fails, and so on. In embodiments, the sensor device 116 and the microphone and the processor of the virtual assistant device 106 can be in communicative connection with each other via a local area network (LAN);

FIG. 2 is a block diagram illustrating basic hardware components of a computing device 200. The computing device 200 shows a structure for devices that can be used as the client device 104, the virtual assistant device 106, the webserver 108, the cloud servers 110, the warranty servers 112, devices in the call center 102, and the databases 114, according to some example embodiments. Computing device 200 may include one or more processors 202, memory 204, network interfaces 206, power source 208, output devices 210, input devices 212, and storage devices 214. Each component provided is interconnected physically, communicatively, and/or operatively for inter-component communications in order to realize functionality ascribed to each of the aforementioned devices in FIG. 1. To simplify the discussion, the singular form will be used for all components identified in FIG. 2, when appropriate, but the use of the singular does not limit the discussion to only one of each component. For example, multiple processors may implement functionality attributed to processor 202.

Processor 202 is configured to implement functions and/or process instructions for execution within the computing device 200. For example, processor 202 executes instructions stored in memory 204 or instructions stored on a storage device 214. In certain embodiments, instructions stored on storage device 214 are transferred to memory 204 for execution at processor 202. Memory 204, which may be a non-transient, computer-readable storage medium, is configured to store information within the device 200 during operation. In some embodiments, memory 204 includes a temporary memory that does not retain information stored when the computing device 200 is turned off. Examples of such temporary memory include volatile memories such as RAM, dynamic random access memories (DRAM), and static random access memories (SRAM). Memory 204 also maintains program instructions for execution by the processor 202 and serves as a conduit for other storage devices (internal or external) coupled to the computing device 200 to gain access to processor 202.

Storage device 214 includes one or more non-transient computer-readable storage media. Storage device 214 is provided to store larger amounts of information than memory 204, and in some instances, configured for long-term storage of information. In some embodiments, the storage device 214 includes non-volatile storage elements. Non-limiting examples of non-volatile storage elements include floppy discs, flash memories, magnetic hard discs, optical discs, solid state drives, or forms of electrically programmable memories (EPROM) or electrically erasable and programmable (EEPROM) memories.

Network interfaces 206 are used to communicate with external devices and/or servers. The computing device 200 may include multiple network interfaces 206 to facilitate communication via multiple types of networks. Network interfaces 206 may include network interface cards, such as Ethernet cards, optical transceivers, radio frequency transceivers, or any other type of device that can send and receive information. Non-limiting examples of network interfaces 206 include radios compatible with several Wi-Fi standards, 3G, 4G, Long-Term Evolution (LTE), Bluetooth®, etc. The network interfaces 206 can support application programming interfaces for receiving data.

Power source 208 provides power to the computing device 200. For example, the computing device 200 may be battery powered. Power source 208 may include a regulator for regulating power from the power grid in the case of a device plugged into a wall outlet.

The computing device 200 may also be equipped with one or more output devices 210. Output device 210 is configured to provide output to a user using tactile, audio, and/or video information. Examples of output device 210 may include a display (cathode ray tube (CRT) display, liquid crystal display (LCD) display, LCD/light emitting diode (LED) display, organic LED display, etc.), a sound card, a video graphics adapter card, speakers, magnetics, or any other type of device that may generate an output intelligible to a user of the computing device 200.

The computing device 200 may also be equipped with one or more input devices 212. Input devices 212 are configured to receive input from a user or the environment where the computing device 200 resides. In certain instances, input devices 212 include devices that provide interaction with the environment through tactile, audio, and/or video feedback. These may include a presence-sensitive screen or a touch-sensitive screen, a mouse, a keyboard, a video camera, microphone, a voice responsive system, or any other type of input device. The input device(s) 212 and the output device(s) 200 can comprise, either collectively or separately, a user interface of the computing device 200.

The hardware components described thus far for the computing device 200 are functionally and communicatively coupled to achieve certain behaviors. In some embodiments, these behaviors are controlled by software running on an operating system of the computing device 200.

In an example a virtual assistant device according to embodiments of the disclosure includes one or more speakers for responding via sound to a user's commands. The virtual assistant device includes one or more microphones for receiving voice commands from the user. The virtual assistant device may include screens for displaying information alongside providing sound responses. The virtual assistant device further supports wireless networking like Wi-Fi for accessing cloud services, and in some environments, communicating with connected internet of things (IoT) devices throughout the home. In some embodiments, the IoT devices can provide status information on user appliances. For example, a refrigerator fashioned with one or more sensors can report status of each sensor to the virtual assistant device so that the virtual assistant device can generate service requests for the refrigerator when specific sensors provide abnormal readings. In embodiments, the appliance includes a data storage device containing appliance data.

The computing device 200 can have residing in memory 204 and/or storage device 214 the appliance service program configured to facilitate an appliance service request to a service provider. The appliance service program can includes a speech recognition module, a command intent discernment module, a fetch module, and an interface module. The speech recognition module is configured to identify speech data from an audio signal from the one or more microphones of the computing device 200 that represent utterances by a user. The command intent discernment module is configured to determine whether the speech data includes command data and appliance data. The command data corresponds to a service connect command. The appliance data includes information about the appliance. The fetch module is configured to communicate with the content server via the network interface, to send the appliance data to the content server in response to the command intent discernment module determining the speech data includes the service connect command, and to receive the appliance service data from the content server. The appliance service data is based upon the appliance data. The interface module is configured to transmit the appliance service data to a user interface through the output device(s) of the computing device 200.

In embodiments, the output device(s) 210 of the computing device 200 can comprise at least a part of the user interface which is in operable arrangement with processor(s) 202 to receive appliance service data therefrom. In embodiments, the user interface comprises a speaker, and the interface module of the appliance service program is configured to transmit the appliance service data as an audio input signal to the speaker. The speaker is configured to produce sound output based upon the audio input signal.

In embodiments, the command intent discernment module comprises a natural language understanding (NLU) engine. In embodiments, the command intent discernment module is configured to determine whether the appliance data of the speech data is sufficient for use to return the appliance service data. The interface module can be configured to transmit to the user interface a message requesting the missing data in response to the command intent discernment module determining the appliance data is missing data, or is otherwise insufficient for use by the appliance service program of the computing device 200.

In embodiments, the appliance service program includes an interrogation module to query an appliance that is the subject of a service request. The interrogation module can be configured to communicate with the appliance to receive appliance data (e.g., model and serial numbers, date of manufacture, etc.) from the data storage device of the appliance.

In embodiments, the appliance service program includes a scheduling module. The scheduling module can be configured to communicate with a service provider server through the network interface, via the cloud server(s) 110 and/or the web server 108, for example, to receive service appointment scheduling data from the service provider server. In embodiments, the appointment scheduling data comprises at least one time at which the service provider is able to service the appliance. In embodiments, the interface module is configured to transmit the appointment scheduling data along with the appliance service data to the user interface of the computing device 200.

Figure 3:
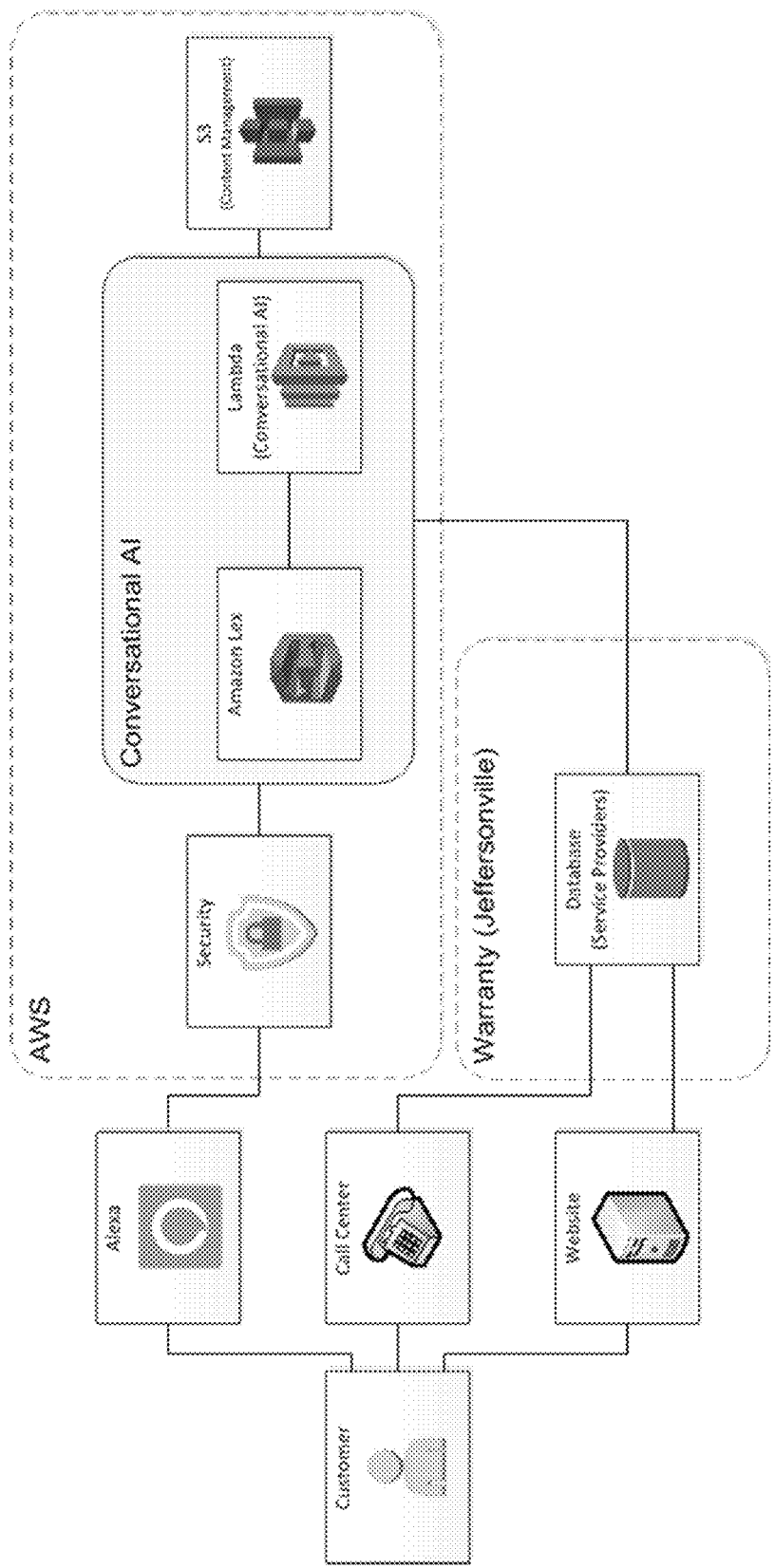
FIG. 3 is a system for generating a request to a service provider using a conversational device according to an embodiment of the present disclosure.

FIG. 3 is a system for generating a request to a service provider using a conversational device according to an embodiment of the present disclosure. The system is analogous to that of FIG. 1. A customer can contact a call center to generate the request to the service provider. The customer can use a website and a chatbot to generate the request to the service provider. The call center and the website can interface with warranty servers and databases which rely on cloud computing to provide functionality. Amazon Alexa intelligent personal assistant is used as an example, and Amazon AWS is used as a cloud computing example. AWS includes a conversational AI that interacts with the customer via the Alexa intelligent personal assistant to generate the request to the service provider.

Figure 4:
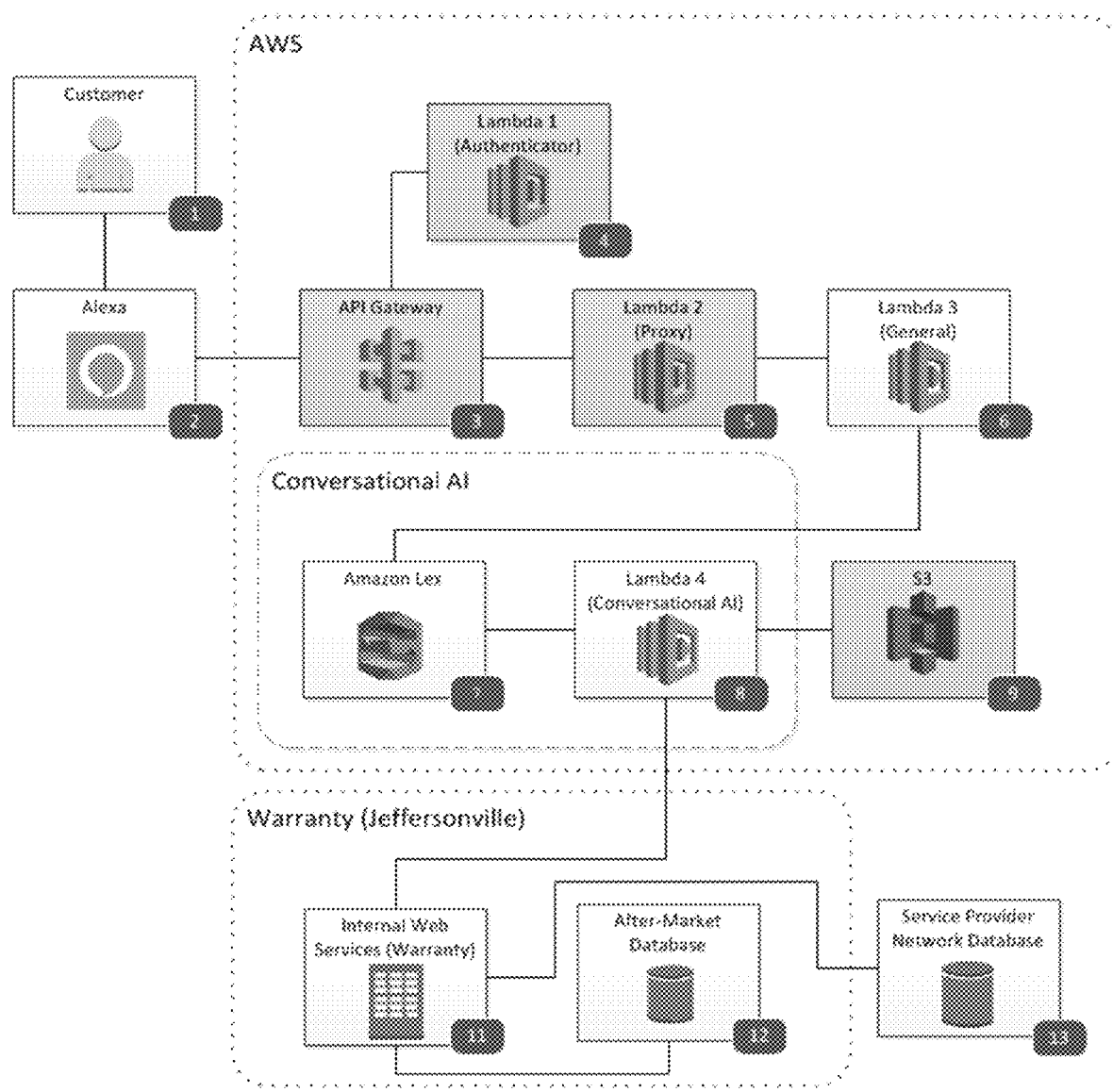
FIG. 4 is a system for generating a request to a service provider using a conversational device according to an embodiment of the present disclosure.

FIG. 4 is a system for generating a request to a service provider using a conversational device according to an embodiment of the present disclosure. Analogous to FIG. 3, FIG. 4 includes additional detail for the Amazon Alexa path.

Figure 5:
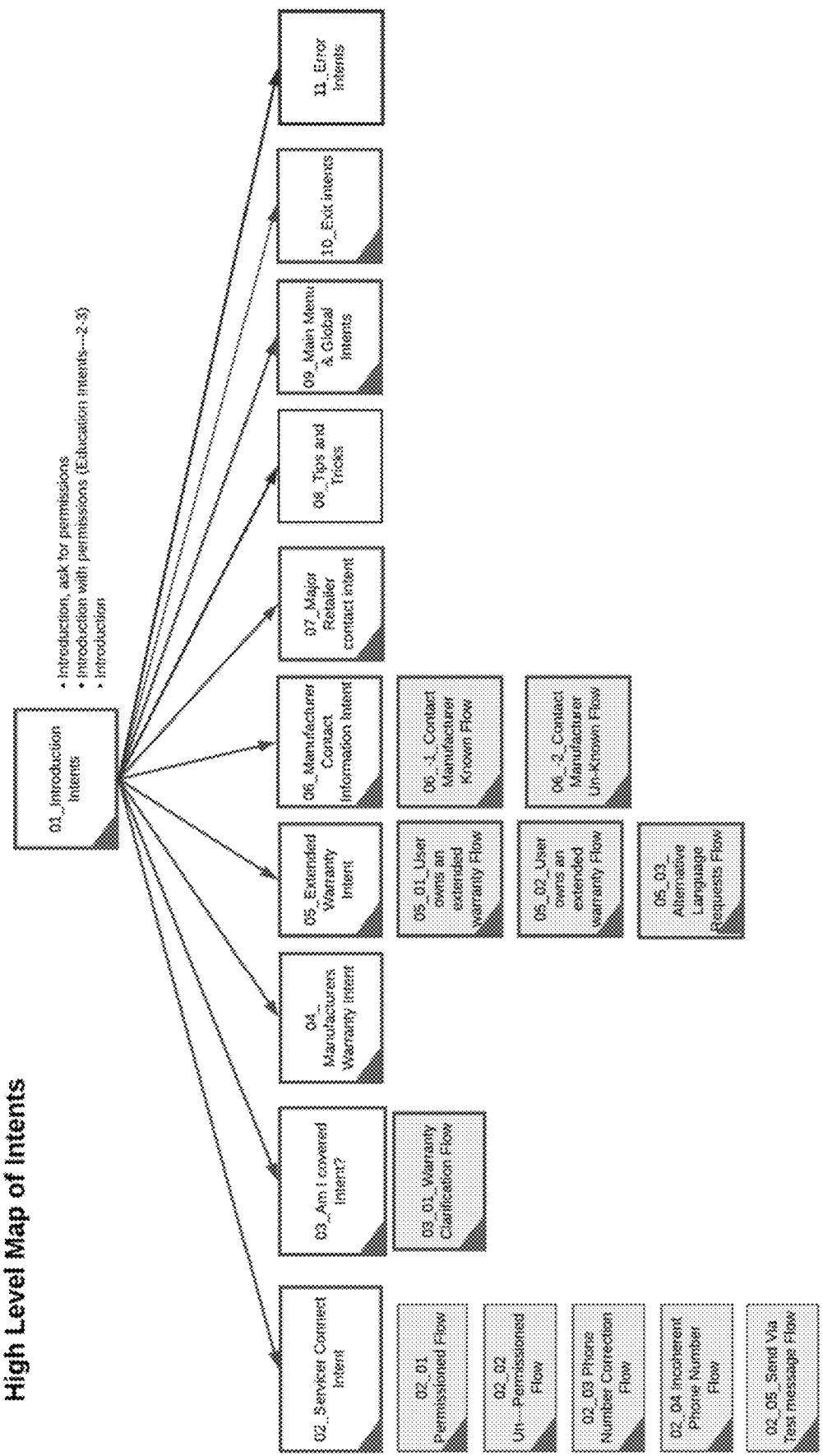
FIG. 5 illustrates a flow diagram showing a map of intents, according to an embodiment of the present disclosure.

Architectural components present in FIGS. 4 and 5 are further described. Omni-channel experience provided by voice, digital and call center that are integrated with existing Warranty infrastructure. Conversational AI uses machine learning to understand user requests and process them (Amazon Lex). AWS S3 Content Management stores service genie manufacturer and retailer phone numbers, appliance tips and tricks and visual assets. Simple Notification Service allows delivery of text messages to mobile devices. Application programming interfaces (APIs) connect service genie to the warranty servers. Servicer API and lead generation API are two examples. New customer data, such as phone numbers, zip code, and appliance information can be stored in databases accessible by the warranty servers, e.g., the aftermarket database for lead generation and analytics. Leverage interface constructs to accelerate call center interface as well as external and internal customer portal. Service genie connects to service providers through the warranty servers to obtain vetted servicers or service providers. In embodiments, the appliance data is in a first format, and the appliance service data is in a second format that is different from the first format. The API gateway is configured to translate the appliance data from the first format to the second format associated with the warranty server, and the API gateway is configured to translate the appliance service data from the second format to the first format associated with the processor.

In some embodiments, the conversational AI assists in scheduling an appointment with a chosen service provider. The conversational AI receives appointment scheduling data from the service provider server. The appointment scheduling data includes a time where the service provider is able to service the appliance. The user can interact with the conversational AI to change the appointment scheduling data.

In some embodiments, the conversational AI determines whether voiced commands from a user includes a service command. For example, the conversational AI can use a probability that a word string of multiple possible word strings in a lattice of multiple word strings corresponds to the service command. The probability can be determined based on a statistical parser. In another example, the conversational AI can use a match score to represent a degree of matching between the user's voiced commands and the service command.

FIG. 5 illustrates a flow diagram showing a map of intents, according to an embodiment of the present disclosure. Intents provide several directions that a conversation with a conversational AI can take. Conversational AIs according to embodiments of the disclosure can have introduction intents (01) which are directed at introductory messages. The conversational AI can introduce itself and ask for permissions to access user data. The conversational AI can determine whether command inputs from the user includes appliance data including information about an appliance to be serviced.

At the stage of the introduction intents (01), the user can ask one or more questions via the client device 104 through a chatbot or the virtual assistant device 106. Depending on speech recognition and/or natural language processing capabilities assisted via the cloud servers 110, one of the intents (02) through (11) is selected.

Servicer connect intent (02): The chatbox or virtual assistant device 106 provides questions that probe the user to determine which servicers or service providers are best situated to perform a repair. This flow includes a permissioned flow (02_01), an unpermissioned flow (02_02), a phone number correction flow (02_03), an incoherent phone number flow (02_04), and a send via text message flow (02_05). Each of these flows can be used at certain points during the conversation to obtain the user's phone number, verify the user's phone number, and providing the list of service providers via text message if the user prefers having the service providers via text message.

Am I covered intent (03): The chatbox of virtual assistant device 106 assists the user in determining whether a certain appliance is covered by warranty or extended warranty. Also, the chatbox or virtual assistant device 106 can ascertain whether the user is asking about a warranty or extended warranty via a warranty clarification flow (03_01).

Manufacturer's warranty intent (04): The chatbox of virtual assistant device 106 assists the user in determining manufacturer's warranty terms, e.g., what the manufacturer's warranty covers.

Extended warranty intent (05): The chatbox of virtual assistant device 106 assists the user in determining extended warranty or service plan terms. This flow includes user owns an extended warranty flow (05_01), user owns an extended warranty flow (05_02), and alternative language requests flow (05_03). The user can ask several questions to get a better idea of the terms, e.g., "can you explain what transferrable means?", "what is a multi-unit discount?", "what is a claim payback award?"

Manufacturer contact information intent (06): The chatbox of virtual assistant device 106 assists the user in determining contact information for the manufacturer of the appliance. Example flows here can include contact manufacturer known flow (06_1) and contact manufacturer unknown flow (06_2) for when manufacturers are readily identifiable and not identifiable.

Major retailer contact intent (07): The chatbox of virtual assistant device 106 assists the user in determining contact information for a major retailer that can assist the user in servicing the appliance.

Tips and Tricks (08): The chatbox of virtual assistant device 106 assists the user by providing tips and tricks associated with their appliance. These can include troubleshooting hints. The user can be provided with one of many tips selected at random.

Main menu and global intents (09): The chatbox of virtual assistant device 106 assists the user in navigating back to a higher level, e.g., in order to change which appliance the user is inquiring about.

Exit intents (10): The chatbox of virtual assistant device 106 exits the conversation with the user.

Error intents (11): The chatbox of virtual assistant device 106 relays an error message to the user.

Figure 6:
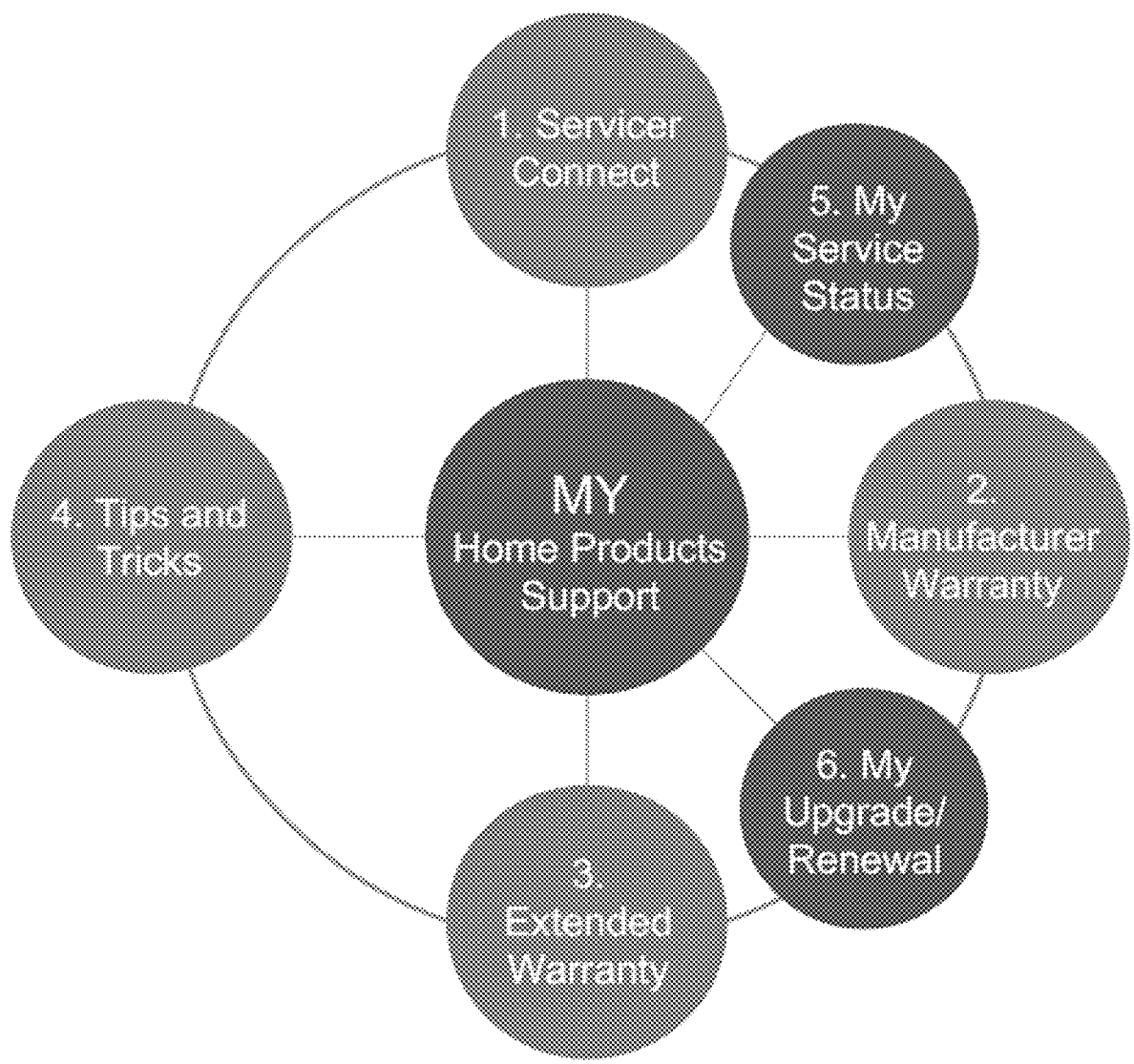
FIG. 6 displays a service genie ecosystem for collaborating with legacy systems that do not provide access to the service genie according to an embodiment of the disclosure.

FIG. 6 displays a service genie ecosystem for collaborating with legacy systems that do not provide access to the service genie via a virtual assistant device. Specific information on product and product warranty as well as end-to-end support is provided via service calls. For example, customers can get real time access to their account information on products, extended warranties, and claims. Customers can schedule service calls aligned to their needs and obtain status on the service. Customers can access to OEM/Extended warranty information and renewal options. Customers can troubleshoot via the service genie ecosystem to solve simple problems at home.

Retailers can optimize costs via customer self-service since retailers will be able to get by with a lower number of support staff. Retailers can use the system for increased revenue generation opportunities by contracting with customers to grant purchases and renewals of warranties or service plans.

Warranty information for each appliance can include information on coverage (when coverage starts and coverage period), parts and labor (functional parts and labor, factory parts coverage, and major component coverage), and claims and service (deductibles and service fees, call center support, in-home service, in-him instruction on how to use product, and manufacturer authorized technicians).

Figure 7:
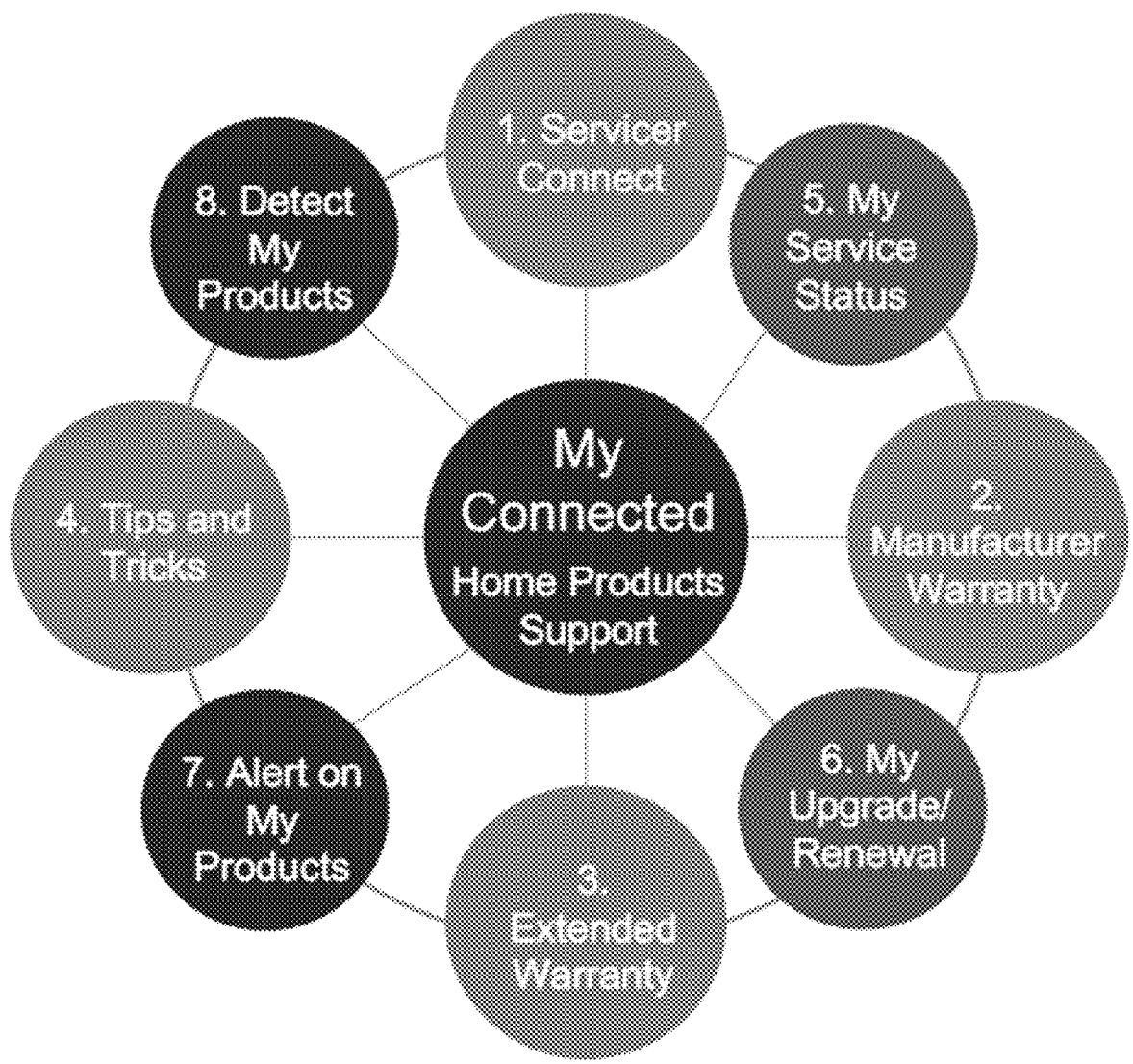
FIG. 7 displays a service genie ecosystem for delivering a smart home enabled device according to an embodiment of the present disclosure.

FIG. 7 displays a service genie ecosystem for delivering a smart home enabled device that helps manage all of a customer's extended warranties for devices and appliances in one place through back-end integration with Warranty servers. The service genie ecosystem enables detection and connection to smart home devices and appliances and allow customers to interact with the devices in a user friendly way. The service genie ecosystem automatically tracks smart home devices and allows the customer to receive notifications from one central solution. The customer has available product support for all products in customer's portfolio. Retailers are provided with an opportunity to support home products not originally purchased and have an ability to identify issues and directly connect to service and claim processes.

Embodiments of an appliance service program constructed according to principles of the present disclosure comprise a computer program product residing on a non-transitory, tangible computer readable medium having a plurality of instructions stored thereon which, when executed by on one or more computing devices, cause the on one or more computing devices to perform steps associated with an embodiment of a method for servicing an appliance following principles of the present disclosure. The appliance service program can comprise a computer-implemented application for processing information exchanged with the one or more computing devices within the network and/or web clients via a web platform such as those known to one of ordinary skill in the art. The appliance service program can contain computer executable instructions adapted to exchange information in the form of data with a data storage device. The appliance service program can include a graphical user interface which can facilitate the input of information into the appliance service program and the display of appliance service information via the appliance service program.

In embodiments, the appliance service program includes a speech recognition module, a command intent discernment module, a fetch module, and an interface module. The speech recognition module can be configured to identify speech data from an audio signal transmitted by a microphone of the virtual assistant device representing utterances by a user. The command intent discernment module can be configured to determine whether the speech data includes command data and appliance data. The command data corresponds to at least one command, such as, a service connect command. The appliance data includes information about the appliance. The fetch module can be configured to communicate with the content server via the network interface. In response to the command intent discernment module determining the speech data includes the service connect command, the fetch module can be configured to send the appliance data to the content server and to receive the appliance service data from the content server. The appliance service data is based upon the appliance data. The interface module can be configured to transmit the appliance service data to a user interface.

In embodiments, the command intent discernment module comprises a natural language understanding (NLU) engine. The command intent discernment module can be configured to determine whether the appliance data of the speech data is sufficient for use by the content server to return the appliance service data. The interface module is configured, in response to the command intent discernment module determining the appliance data is missing data, to transmit to the user interface a message requesting the missing data. In embodiments, the content server comprises a legacy system utilizing non-appliance data to organize the appliance service data, and the interface module is configured to request the missing data, even when it includes the non-appliance data.

In embodiments, the service connect command is one of a set of commands, and the set of commands respectively correspond to a set of tasks, such as the intents described above. The command intent discernment module can be configured to determine whether the speech data includes command data corresponding to one of the set of commands, and the fetch module can be configured to communicate with the content server via the network interface, in response to the command intent discernment module determining the speech data includes one of the set of commands, to send the appliance data to the content server and to receive appliance service data from the content server. The appliance service data can be based upon at least one of the appliance data and the identified at least one of the set of commands. The command intent discernment module can be configured to determine whether the appliance data is sufficient to perform the task corresponding to the identified command, and the interface module can be configured, in response to the command intent discernment module determining the appliance data is missing data, to transmit to the user interface a message requesting the missing data.

In embodiments, the user interface (e.g., the virtual assistant device) includes a speaker. The interface module can be configured to transmit the appliance service data as an audio input signal to the speaker, and the speaker can be configured to produce sound output based upon the audio input signal.

In embodiments, the appliance comprises a "smart" appliance and includes a data storage device containing appliance data pertaining to the appliance in question. The appliance can be communicatively connected to a local area network (LAN) that includes the appliance, a microphone of a virtual assistant device, and a processor associated with the appliance service program. The appliance service program can include an interrogation module configured to communicate with the appliance over the LAN to receive appliance data from the data storage device of the appliance for use by the appliance service program In embodiments, the network interface is in communicative relationship with a service provider server to exchange data therebetween. The appliance service program can include a scheduling module configured to communicate with the service provider server through the network interface to receive service appointment scheduling data from the service provider server. The appointment scheduling data can comprise at least one time at which the service provider is able to service the appliance. The interface module can be configured to transmit the appointment scheduling data along with the appliance service data retrieved from the warranty server(s) to the user interface so that the user can be provided with at least one appliance service provider in the area and at least one time in the future at which the service provider could service the appliance in question.

In various embodiments, an appliance service program in accordance with principles of the present disclosure can take the form of a computer program product on a non-transitory, tangible computer-readable storage medium having computer-readable program code means embodied in the storage medium. Software implementations of the techniques for servicing an appliance as described herein can be stored on any suitable tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, a non-transitory, tangible storage medium includes a distribution medium and art-recognized equivalents and successor media, in which the software implementations herein are stored.

Additionally, embodiments of an appliance service program stored upon a non-transitory, computer-readable medium following principles of the present disclosure contain a plurality of instructions which, when executed by a processor, cause the processor to perform steps associated servicing an appliance following principles of the present disclosure. In embodiments, the appliance service program stored upon a non-transitory, computer-readable medium can be configured to carry out any embodiment of a method of servicing an appliance following principles of the present disclosure. In embodiment, a processor is adapted to execute the programming stored upon the non-transitory computer readable medium to perform various methods, processes, and modes of operations in a manner following principles of the present disclosure.

In embodiments, a non-transitory, computer-readable storage medium bears computer executable instructions for servicing a home appliance. The instructions, when executing on one or more computing devices, performing the steps of: identifying speech data from an audio signal from a microphone, the audio signal representing utterances by a user; determining whether the speech data includes command data and appliance data, the command data corresponding to a service connect command, and the appliance data including information about the appliance; in response to determining the speech data includes the service connect command, communicating with a content server via a network interface to send the appliance data to the content server and to receive appliance service data from the content server, the appliance service data based upon the appliance data; and transmitting the appliance service data to a user interface.

In embodiments of a non-transitory, computer-readable storage medium according to principles of the present disclosure, the appliance data is in a first format, and the appliance service data is in a second format that is different from the first format. The computer executable instructions stored on the tangible computer-readable medium, when executing on one or more computing devices, perform steps of: translating the appliance data from the first format to the second format associated with the content server, and translating the appliance service data from the second format to the first format.

In embodiments of a non-transitory, computer-readable storage medium according to principles of the present disclosure, the computer executable instructions stored on the tangible computer-readable medium, when executing on one or more computing devices, perform steps of: determining whether the appliance data of the speech data is sufficient for use by the content server to return the appliance service data, and, in response to determining the appliance data is missing data, transmitting to the user interface a message requesting the missing data. In at least some of such embodiments in which the content server comprises a legacy system utilizing non-appliance data to organize the appliance service data, the missing data includes the non-appliance data.

In embodiments of a non-transitory, computer-readable storage medium according to principles of the present disclosure, the service connect command is one of a set of commands. The set of commands respectively correspond to a set of tasks. The computer executable instructions stored on the tangible computer-readable medium, when executing on one or more computing devices, perform steps of: determining whether the speech data includes command data corresponding to one of the set of commands, and, in response to determining the speech data includes one of the set of commands, communicating with the content server via the network interface to send the appliance data to the content server and to receive appliance service data from the content server. The appliance service data is based upon at least one of the appliance data and said one of the set of commands. In at least some of such embodiments, the computer executable instructions stored on the tangible computer-readable medium, when executing on one or more computing devices, perform steps of: determining whether the appliance data is sufficient to perform the task corresponding to the identified command, and, in response to determining the appliance data is missing data, transmitting to the user interface a message requesting the missing data.

In embodiments of a non-transitory, computer-readable storage medium according to principles of the present disclosure, the computer executable instructions stored on the tangible computer-readable medium, when executing on one or more computing devices, perform a step of: transmitting the appliance service data as an audio input signal to a speaker. In embodiments of a non-transitory, computer-readable storage medium according to principles of the present disclosure, the computer executable instructions stored on the tangible computer-readable medium, when executing on one or more computing devices, perform a step of: communicating with the appliance over a local area network (LAN) to receive appliance data from a data storage device of the appliance.

In embodiments of a non-transitory, computer-readable storage medium according to principles of the present disclosure, the computer executable instructions stored on the tangible computer-readable medium, when executing on one or more computing devices, perform steps of: communicating with a service provider server through the network interface to receive service appointment scheduling data from the service provider server and transmitting the appointment scheduling data along with the appliance service data to the user interface. The appointment scheduling data comprise at least one time at which the service provider is able to service the appliance In embodiments of a non-transitory, computer-readable storage medium according to principles of the present disclosure, the speech data comprises natural language input comprising a lattice of multiple word strings. In at least some of such embodiments, determining whether the speech data includes command data corresponding to the service connect command is based at least in part on a probability that a word string of multiple possible word strings in the lattice corresponds to the service connect command. In at least some of such embodiments, the probability comprises a fuzzy match score representing a degree of matching between the natural language input and the service connect command. In at least some of such embodiments, the probability comprises a probability score determined at least in part by a statistical parser. In at least some of such embodiments, the probability comprises a probability score based at least in part on an identification of the service connect command in a stored natural language input.

In embodiments of a method of servicing an appliance following principles of the present disclosure, a system constructed according to principles of the present disclosure is used to carry out steps as discussed herein. In embodiments, a method of servicing an appliance following principles of the present disclosure can include any embodiment of a non-transitory, computer-readable storage medium according to principles discussed herein.

In one embodiment of a method for servicing an appliance according to principles of the present disclosure, a microphone transmits an audio signal to a processor. The audio signal is based upon sound input received by the microphone. The processor is employed to execute computer executable instructions stored on a non-transitory, computer-readable medium to perform steps. Speech data is identified from the audio signal representing utterances by a user. Whether the speech data includes a service connect command data and appliance data including information about the appliance is determined. In response to determining the speech data includes the service connect command, a network interface is used to send the appliance data to a content server and to receive appliance service data from the content server. The appliance service data is based upon the appliance data. The appliance service data is transmitted to a user interface. In embodiments of method of servicing an appliance according to principles of the present disclosure, the appliance comprises one of a refrigerator, an ice maker, a stove, a microwave, a dishwasher, a washing machine, a clothes dryer, a ceiling fan, a garage door opener, an air conditioner, a furnace, a pool heater, an irrigation system, and a security system.

In embodiments of method of servicing an appliance according to principles of the present disclosure, the network interface comprises an application programming interface (API) gateway. The appliance data is in a first format, and the appliance service data is in a second format that is different from the first format. To facilitate communication with the content server, the API gateway is configured to translate the appliance data from the first format to the second format associated with the content server and to translate the appliance service data from the second format to the first format associated with the processor.

In embodiments of method of servicing an appliance according to principles of the present disclosure, the computer executable instructions stored on the non-transitory, computer-readable medium perform steps including: determining whether the appliance data of the speech data is sufficient for use by the content server to return the appliance service data, and, in response to determining the appliance data is missing data, transmitting to the user interface a message requesting the missing data. In at least some of such embodiments, the content server comprises a legacy system utilizing non-appliance data to organize the appliance service data, and the missing data includes the non-appliance data.

In embodiments of method of servicing an appliance according to principles of the present disclosure, the service connect command is one of a set of commands. The set of commands respectively correspond to a set of tasks. The computer executable instructions stored on the non-transitory, computer-readable medium perform steps including: determining whether the speech data includes command data corresponding to one of the set of commands, and, in response to determining the speech data includes one of the set of commands, communicating with the content server via the network interface to send the appliance data to the content server and to receive appliance service data from the content server. The appliance service data can be based upon at least one of the appliance data and said one of the set of commands. In at least some of such embodiments, the computer executable instructions stored on the non-transitory, computer-readable medium perform steps including: determining whether the appliance data is sufficient to perform the task corresponding to the identified command, and, in response to determining the appliance data is missing data, transmitting to the user interface a message requesting the missing data.

In embodiments of method of servicing an appliance according to principles of the present disclosure, the computer executable instructions stored on the non-transitory, computer-readable medium perform steps including transmitting the appliance service data as an audio input signal to a speaker. The speaker can produce sound output based upon the audio input signal.

In embodiments of method of servicing an appliance according to principles of the present disclosure, the computer executable instructions stored on the non-transitory, computer-readable medium perform steps including communicating with the appliance over a local area network (LAN) to receive appliance data from a data storage device of the appliance. In embodiments of method of servicing an appliance according to principles of the present disclosure, the computer executable instructions stored on the non-transitory, computer-readable medium perform steps including: communicating with a service provider server through the network interface to receive service appointment scheduling data from the service provider server, the appointment scheduling data comprising at least one time at which the service provider is able to service the appliance, and transmitting the appointment scheduling data along with the appliance service data to the user interface.

In embodiments of method of servicing an appliance according to principles of the present disclosure, the speech data comprises natural language input comprising a lattice of multiple word strings. In at least some of such embodiments, determining whether the speech data includes command data corresponding to the service connect command is based at least in part on a probability that a word string of multiple possible word strings in the lattice corresponds to the service connect command. In at least some of such embodiments, the probability comprises a fuzzy match score representing a degree of matching between the natural language input and the service connect command. In at least some of such embodiments, the probability comprises a probability score determined at least in part by a statistical parser. In at least some of such embodiments, the probability comprises a probability score based at least in part on an identification of the service connect command in a stored natural language input.

DESCRIPTION OF THE APPENDIX

An appendix is provided for further details. Further and alternative aspects and features of the principles relating to appliance care and servicing disclosed herein will be appreciated from the appendix. The following includes short descriptions of each page of the appendix.

Page A-1 shows another system diagram for generating a request to a service provider according to an embodiment of the disclosure. Google Home device is included as well as examples of other front end integrators for communicating with the conversational AI in the cloud.

Page A-2 shows further detail in a system for generating a request to a service provider according to an embodiment of the disclosure.

Page A-3 shows information flow in a system for generating a request to a service provider according to an embodiment of the disclosure.

Page A-4 delineates three sections—customer endpoints, cloud servers, and warranty endpoints—in a system for generating a request to a service provider according to an embodiment of the disclosure.

Page A-5 shows a system architecture for generating a request to a service provider according to an embodiment of the disclosure.

Pages B-1 to B-3 show a flow diagram for servicer connect intent (02_01). In Page B-1, the customer asks for a repair of an appliance and if the appliance and the service genie determines whether the appliance is a recognized brand. Page B-2 shows the flow for the recognized brand, and Page B-3 shows the flow for the unrecognized brand.

Pages B-4 to B-6 show a flow diagram for an unpermissioned flow (02_02). In Page B-4, the customer asks for a repair of an appliance and if the appliance brand is recognized, the steps in B-4 and B-5 are taken. Page B-6 shows the flow for the unrecognized brand.

Pages B-7 to B-13 show different flows for completing one or more of the above identified flows. Page B-7 shows phone number correction flows for both permissioned and unpermissioned events. B-7 also shows an incoherent number flow.

Page B-8 shows a flow for sending information via SMS.

Page B-9 shows a flow where a service provider fails to find a servicer for brand and appliance combination when multiple servicers are involved.

Page B-10 shows a flow where service provider fails to find servicer for brand and appliance combination when a single servicer is involved.

Page B-11 shows incoherent zip flow, unrecognized zip flow, example network errors, and a zip code update flow.

Page B-12 shows two flows for sending via SMS with phone number and sending via SMS with phone number and a new number.

Page B-13 shows a phone number to zip code fix in an unpermissioned flow.

Pages C-1 to C-3 shows flow diagrams for "am I covered intent?" (03). In Page C-1, the customer asks whether an appliance is covered under warranty.

Page C-2 provides different pathways based on the answer to the question in Page C-1.

Page C-3 provides a flow for further determining what is covered under a warranty, if covered under the warranty—warranty clarification intent (03_02).

Pages D-1 and D-2 provide flows under extended warranty intent (05). Page D-1 provides a flow for user owns an extended warranty (05_01) and based on this information, the virtual assistant device 106 can contact manufacturer or contact retailer.

Page D-2 provides flows under alternative language requests for service contract or service plan (05_03).

Page D-3 provides different client devices (smart phones) showing different ways of displaying information. From left to right is shown, a device with a list of service providers and contact information, a device showing a card with a service provider and its contact information, and a device showing extended warranty information.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for servicing an appliance, the system comprising:
    a microphone configured to generate an audio signal based upon sound input received by the microphone;
    a non-transitory computer-readable medium including an appliance service program;
    a processor in operable arrangement with the microphone and the non-transitory computer-readable medium, the processor arranged with the microphone to receive the audio signal therefrom, and the processor configured to execute the appliance service program;
    a network interface configured to receive appliance service data from a content server, the content server located remotely from the processor, the network interface in communicative relationship with the processor and the content server to exchange data therebetween;
    wherein the appliance service program includes a speech recognition module, a command intent discernment module, a fetch module, and an interface module,
        the speech recognition module configured to identify speech data from the audio signal representing utterances by a user,
        the command intent discernment module configured to determine whether the speech data includes command data and appliance data, the command data corresponding to a service connect command, and the appliance data including information about the appliance,
        the fetch module configured to communicate with the content server via the network interface, to send the appliance data to the content server in response to the command intent discernment module determining the speech data includes the service connect command, and to receive the appliance service data from the content server, the appliance service data based upon the appliance data,
        the interface module configured to transmit the appliance service data to a user interface.

2. The system according to claim 1, the system further comprising:
    the user interface, the user interface in operable arrangement with the processor to receive the appliance service data therefrom.

3. The system according to claim 2, wherein the user interface comprises a speaker, and wherein the interface module is configured to transmit the appliance service data as an audio input signal to the speaker, and the speaker is configured to produce sound output based upon the audio input signal.

4. The system according to claim 1, wherein the appliance comprises one of a refrigerator, an ice maker, a stove, a microwave, a dishwasher, a washing machine, a clothes dryer, a ceiling fan, a garage door opener, an air conditioner, a furnace, a pool heater, an irrigation system, and a security system.

5. The system according to claim 1, the system further comprising:
    a local area network (LAN);
    wherein the appliance, the microphone, and the processor are in communicative connection with each other via the LAN.

6. The system according to claim 5, wherein the appliance includes a data storage device containing appliance data, and wherein the appliance service program includes an interrogation module, the interrogation module configured to communicate with the appliance over the LAN to receive appliance data from the data storage device of the appliance.

7. The system according to claim 1, wherein the network interface is in communicative relationship with a service provider server to exchange data therebetween, wherein the appliance service program includes a scheduling module, the scheduling module configured to communicate with the service provider server through the network interface to receive service appointment scheduling data from the service provider server, the service appointment scheduling data comprising at least one time at which the service provider server is able to service the appliance, and wherein the interface module is configured to transmit the service appointment scheduling data along with the appliance service data to the user interface.

8. The system according to claim 1, wherein the network interface comprises an application programming interface (API) gateway.

9. The system according to claim 8, wherein the appliance data is in a first format, and the appliance service data is in a second format, the second format being different from the first format, the API gateway configured to translate the appliance data from the first format to the second format associated with the content server, and the API gateway configured to translate the appliance service data from the second format to the first format associated with the processor.

10. The system according to claim 1, wherein the command intent discernment module comprises a natural language understanding (NLU) engine.

11. The system according to claim 10, wherein the command intent discernment module is configured to determine whether the appliance data of the speech data is sufficient for use by the content server to return the appliance service data, and the interface module is configured, in response to the command intent discernment module determining the appliance data is missing data, to transmit to the user interface a message requesting the missing data.

12. The system according to claim 11, wherein the content server comprises a legacy system utilizing non-appliance data to organize the appliance service data, and wherein the missing data includes the non-appliance data.

13. The system according to claim 10, wherein the service connect command is one of a set of commands, the set of commands respectively corresponding to a set of tasks, and wherein the command intent discernment module is configured to determine whether the speech data includes command data corresponding to one of the set of commands, and the fetch module is configured to communicate with the content server via the network interface, in response to the command intent discernment module determining the speech data includes one of the set of commands, to send the appliance data to the content server and to receive appliance service data from the content server, the appliance service data based upon at least one of the appliance data and said one of the set of commands.

14. The system according to claim 13, wherein the command intent discernment module is configured to determine whether the appliance data is sufficient to perform a task corresponding to an identified command, and the interface module is configured, in response to the command intent discernment module determining the appliance data is missing data, to transmit to the user interface a message requesting the missing data.

15. A method for servicing an appliance, the method comprising:

transmitting, by a microphone, an audio signal to a processor, the audio signal based upon sound input received by the microphone;

employing the processor to execute computer executable instructions stored on a non-transitory, computer-readable medium to perform steps, the steps including:

identifying speech data from the audio signal representing utterances by a user, determining whether the speech data includes a service connect command and appliance data including information about the appliance, in response to determining the speech data includes the service connect command, using a network interface to send the appliance data to a content server and to receive appliance service data from the content server, the appliance service data based upon the appliance data, transmitting the appliance service data to a user interface.

16. The method according to claim 15, wherein the computer executable instructions stored on the non-transitory, computer-readable medium perform steps including transmitting the appliance service data as an audio input signal to a speaker, the method further comprising:

producing sound output, by the speaker, based upon the audio input signal.

17. The method according to claim 15, wherein the computer executable instructions stored on the non-transitory, computer-readable medium perform steps including communicating with the appliance over a local area network (LAN) to receive the appliance data from a data storage device of the appliance.

18. The method according to claim 15, wherein the computer executable instructions stored on the non-transitory, computer-readable medium perform steps including:

communicating with a service provider server through the network interface to receive service appointment scheduling data from the service provider server, the service appointment scheduling data comprising at least one time at which the service provider server is able to service the appliance, and transmitting the service appointment scheduling data along with the appliance service data to the user interface.

19. The method according to claim 15, wherein the speech data comprises natural language input comprising a lattice of multiple word strings.

20. The method according to claim 19, wherein determining whether the speech data includes the service connect command is based at least in part on a probability that a word string of multiple possible word strings in the lattice corresponds to the service connect command.

21. The method according to claim 20, wherein the probability comprises a fuzzy match score representing a degree of matching between the natural language input and the service connect command.

22. The method according to claim 20, wherein the probability comprises a probability score determined at least in part by a statistical parser.

23. The method according to claim 20, wherein the probability comprises a probability score based at least in part on an identification of the service connect command in a stored natural language input.

24. A non-transitory, computer-readable storage medium bearing computer executable instructions for servicing a home appliance, the computer executable instruction, when executing on one or more computing devices, performing the steps of:

identifying speech data from an audio signal from a microphone, the speech data representing utterances by a user;

determining whether the speech data includes a service connect command and appliance data including information about the home appliance;

in response to determining the speech data includes the service connect command, using a network interface to send the appliance data to a content server and to receive appliance service data from the content server, the appliance service data based upon the appliance data;

transmitting the appliance service data to a user interface.

25. The non-transitory, computer-readable storage medium according to claim 24, wherein the computer executable instructions stored on a tangible computer-readable medium, when executing on one or more computing devices, perform steps of:

determining whether the appliance data of the speech data is sufficient for use by the content server to return the appliance service data, and in response to determining the appliance data is missing data, transmitting to the user interface a message requesting the missing data;

wherein the content server comprises a legacy system utilizing non-appliance data to organize the appliance service data, and wherein the missing data includes non-appliance data.

* * * * *